Patented Sept. 7, 1948

2,448,976

UNITED STATES PATENT OFFICE 2,448,976

POLYMERIZATION OF ALPHA ALKYL STYRENES

Randall G. Heiligmann, Yeadon, Pa., assignor to The Atlantic Refining Company, Philadelphia, Pa., a corporation of Pennsylvania No Drawing. Application July 20, 1945, Serial No. 606,294

8 Claims. (Cl. 260—91)

The present invention relates to the polymerization of unsaturated compounds to produce useful resinous materials, and relates more particularly to the polymerization of an alpha alkyl styrene, mixtures of alpha alkyl styrenes, or polymerizable mixtures containing substantial amounts of one or more alpha alkyl styrenes.

An object of the invention is the production of solid polymers or resins suitable for molding or other purposes by the polymerization of alpha alkyl styrenes in the presence of a hydrogenation catalyst and an alkali metal hydrocarbon compound at temperatures between 50° F. and 300° F. under pressures of from atmospheric up to about 2000 lbs. per square inch, and preferably at temperatures between 100° F. and 150° F. and pressures of from 500 to 2000 lbs. per square inch, pressures between 1000 and 1500 lbs. per square inch being particularly suitable.

The present process is applicable to the homopolymerization of an alpha alkyl styrene, the copolymerization of two or more alpha alkyl styrenes, and the copolymerization of an alpha alkyl styrene or styrenes with olefins or diolefins or mixtures thereof. As used herein, the term "alpha alkyl styrene" includes any alpha alkyl styrene represented by the formula:

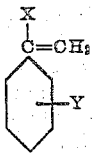

wherein X may be an alkyl group such as methyl, ethyl, propyl, or isopropyl, etc., but is preferably methyl, and Y may be hydrogen or alkyl, but is preferably methyl, ethyl, propyl, or isopropyl.

The process of the present invention is particularly applicable to the production of solid resinous materials having molecular weights within the range of 3000 to 30,000, which materials are usually produced in the form of white granules or powder readily molded at elevated temperature.

In carrying out the process, the hydrogenation catalyst, either supported or unsupported, and the alkali metal hydrocarbon compound, preferably in solution in a solvent is introduced into a reaction vessel provided with stirring means and heating means, such as an autoclave, after the air in the vessel has been displaced with dry nitrogen or other inert gas. The alpha alkyl styrene, as such or in solution in a suitable solvent, is thereafter introduced into the vessel. The exact order of introduction of the components into the vessel is immaterial, so long as the components, the vessel, and the atmosphere within the vessel are substantially dry. If the polymerization is to be carried out under elevated pressure, an inert gas such as nitrogen may be charged to the vessel in an amount sufficient to give the desired pressure at the operating temperature, allowance being made for pressure effects of the reacting components, and particularly the solvent. The vessel and contents are then brought to the desired operating temperature and pressure, and the contents are vigorously stirred during the course of the polymerization. Depending upon the reactants, the catalyst, and the temperature and pressure, the time required for polymerization may vary considerably and usually ranges from 1 to 12 hours. Upon completion of the reaction the temperature and pressure of the vessel and contents may be reduced, and the contents treated for the recovery of the desired polymers. For example, the reaction mixture may be mixed with ice water acidified with a mineral acid (HCl or $H_2SO_4$) to decompose any residual catalyst, and the crude polymer may be separated and steam distilled to remove solvent, catalyst components, or unconverted alpha alkyl styrene. The polymer is usually recovered as a sticky, solid mass and may subsequently be dissolved in a hot solvent, such as benzene and then precipitated with an agent such as n-pentane as a white, powder-like solid.

My invention may be further illustrated by the following example, which, however, is not to be construed as limiting the scope thereof.

A hydrogenation catalyst comprising nickel-on-kieselguhr was prepared by impregnating kieselguhr with an aqueous solution of nickel nitrate, drying the impregnated support, and igniting to convert the nickel nitrate to nickel oxide (35% based on the kieselguhr). The supported nickel oxide was then reduced in a stream of hydrogen at 842° F. for 2 hours and there was obtained an active nickel catalyst which was stored in an inert atmosphere until used.

An alkali metal hydrocarbon compound was produced by reacting 7 parts by weight (1 mole) of metallic lithium with 46 parts by weight (0.5 mole) of n-butyl chloride in 500 parts by weight (700 volumes) of n-pentane. The reaction was carried out in an atmosphere of dry nitrogen at about 40° C. under reflux, the reaction time being about 3 hours. Byproduct lithium chloride was separated from the pentane solution of n-butyl lithium, the latter being obtained in a yield of about 70% of theoretical. The n-butyl lithium solution was stored in an inert atmosphere until used.

The polymerization reaction was carried out as follows:

An autoclave provided with a stirrer and heating means was flushed with dry nitrogen and then charged with 1 gram of activated nickel-on-kieselguhr, 108 cc. of solution of n-butyl lithium in n-pentane (3.44 grams of n-butyl lithium), and 73 grams of alpha methyl styrene. The autoclave was then charged with dry nitrogen at 1200 lbs. per square inch pressure and the contents of the autoclave were vigorously stirred. At the same time, heat was applied, and the temperature was raised to 285° F. over a period of 1 hour, the pressure reaching 1800 lbs. per square inch at equilibrium. Stirring was continued under these conditions for a period of 5 hours, after which time the autoclave was permitted to cool to room temperature. The pressure was released and the reaction mixture was poured from the autoclave into ice water acidified with hydrochloric acid. The crude polymer, n-pentane, n-butyl chloride, and unconverted alpha methyl styrene were separated from the water and the product was steam distilled to remove n-pentane, n-butyl chloride, and monomeric alpha methyl styrene. The polymer was recovered as a sticky solid mass and was dissolved in hot benzene and precipitated with n-pentane as a white powder having a molecular weight of 4650, capable of being molded at elevated temperatures.

A second run was made, similar in all respects to that above described with the exception that the hydrogenation catalyst, i. e., nickel-on-kieselguhr was omitted. In this case there was obtained a polymer of oil-like consistency from which no solid polymer was precipitated by the addition of n-pentane.

While the present invention has been described particularly with reference to the polymerization of alpha methyl styrene, such invention is equally well adapted in the polymerization of other alpha alkyl styrenes or mixtures thereof, including but not limited to alpha methyl para methyl styrene, alpha methyl para ethyl styrene, alpha methyl para propyl styrene, alpha methyl para isopropyl styrene, alpha methyl meta methyl styrene, alpha ethyl styrene, alpha ethyl para ethyl styrene, alpha propyl styrene, alpha propyl para propyl styrene, and the like.

While it is preferred to use a hydrogenation catalyst such as supported or unsupported nickel, any hydrogenation catalyst including metallic and oxide hydrogenating catalysts may be used. Quantities of the catalyst may range from 0.1% to 5% by weight of the alpha alkyl styrene. Such catalytic metals and oxides include those of iron, cobalt, nickel, manganese, silver, copper, platinum, palladium, ruthenium, rhodium, and osmium. These catalysts may be used either supported or unsupported, although the use of a suitable inert support such as kieselguhr, pumice, kaolin, and the like generally increases the extent of the active catalyst surface and consequently the catalytic activity.

Although lithium alkyls are preferred for use with the hydrogenation catalyst, any alkali metal hydrocarbon compound where the alkali metal is directly bonded to a hydrocarbon radical may be employed. The lithium compounds are preferred since they are generally more soluble in the ordinary solvents than the sodium or potassium compounds, and are, therefore, more easy to handle in the polymerization operation. The alkali metal hydrocarbon compounds have been found to be effective in quantities ranging from 0.1% to 5% by weight based on the alpha alkyl styrene. Larger amounts may be used without detriment but are uneconomical. Typical compounds include ethyl, propyl, isopropyl, butyl, isobutyl, amyl, isoamyl, and hexyl lithium, as well as the lithium aryls such as phenyl lithium and benzyl lithium, and the lithium aralkyls such as tolyl, ethyl phenyl, xylyl, isopropyl phenyl, and butyl phenyl lithium. Corresponding compounds of sodium and potassium may also be employed.

I have found that a variety of solvents may be used in conjunction with the catalyst and alpha alkyl styrene, and these include liquid propane, butane, isobutane, pentane, isopentane, hexane, petroleum ether or naphtha, diethyl ether, benzene, toluene, xylene, cumene, halogenated hydrocarbons, and the like. It is necessary that these be inert with respect to the catalyst, i. e., they must not destroy or render inactive the alkali metal hydrocarbon compounds or the hydrogenation catalyst used in the polymerization. Since the alkali metal hydrocarbon compounds are generally prepared and used in solution in a solvent, for example, dry pentane, it is usually desirable to employ the same solvent as a diluent for the alpha alkyl styrene if it is necessary to utilize a diluent. For example, the alkali metal hydrocarbon compound may be prepared using a solvent in such quantity that no preliminary dilution of the alpha alkyl styrene is necessary. On the other hand, when a more concentrated solution of alkali metal hydrocarbon compound is used, then predilution of the alpha alkyl styrene with solvent may be practiced. In any event, sufficient solvent or diluent should be employed to assure efficient agitation and ease of handling during and subsequent to polymerization.

The polymerization reaction may be carried out at temperatures between 50° F. and 300° F., and preferably between 100° F. and 150° F. In general, the higher the temperature employed, the lower will be the ultimate molecular weight of the polymer. The pressure employed during the reaction may range from atmospheric up to 2000 lbs. per square inch, or higher, 1000 to 1500 lbs. per square inch being preferred. The use of low pressure generally leads to slower reaction and lower polymer yields, therefore, elevated pressures, particularly above about 500 lbs. per square inch are desirable in order to increase the reaction velocity and yield.

While the process of the present invention is particularly adapted in the homopolymerization of alpha alkyl styrenes, it is also applicable in the copolymerization of such compounds with reactive mono- and diolefins, including isobutylene, isoamylene, isohexylene, isoprene, butadiene, pentadiene, styrene, alkyl styrenes, and the like.

I claim:

1. A process for polymerizing an alpha alkyl styrene in which the alkyl group contains not more than 3 carbon atoms, which comprises contacting said alpha alkyl styrene with a hydrogenating catalyst and an alkali metal hydrocarbon compound where the alkali metal is directly bonded to a hydrocarbon radical, at a temperature between 50° F. and 300° F. and a pressure between 500 and 2000 lbs. per square inch in the presence of an inert solvent.

2. A process for polymerizing an alpha alkyl styrene in which the alkyl group contains not more than 3 carbon atoms, which comprises contacting said alpha alkyl styrene with a nickel catalyst and a lithium alkyl in the presence of an inert solvent at a temperature between 100° F. and 150° F. and a pressure between 1000 and 1500 lbs per square inch.

3. A process for polymerizing alpha methyl styrene, which comprises contacting said alpha methyl styrene with a nickel catalyst and a lithium alkyl in the presence of an inert solvent at a temperature between 50° F. and 300° F. and a pressure between 500 and 2000 lbs. per square inch.

4. A process for polymerizing alpha methyl styrene, which comprises contacting said alpha methyl styrene with a nickel catalyst and n-butyl lithium in the presence of an inert solvent at a temperature between 100° F. and 150° F. and a pressure between 1000 and 1500 lbs. per square inch.

5. A process for polymerizing alpha methyl styrene, which comprises contacting said alpha methyl styrene with a nickel catalyst and a pentane solution of n-butyl lithium at a temperature between 100° F. and 150° F. and a pressure between 1000 and 1500 lbs. per square inch.

6. A process for polymerizing an alpha alkyl styrene in which the alkyl group contains not more than three carbon atoms, which comprises contacting said alpha alkyl styrene with a hydrogenating catalyst and an alkali metal alkyl compound where the alkali metal is directly bonded to the alkyl radical, at a temperature between 50° F. and 300° F. and a pressure between 500 and 2000 lbs. per square inch in the presence of an inert solvent.

7. A process for polymerizing an alpha alkyl styrene in which the alkyl group contains not more than three carbon atoms, which comprises contacting said alpha alkyl styrene with a hydrogenating catalyst and an alkali metal aryl compound where the alkali metal is directly bonded to the aryl radical, at a temperature between 50° F. and 300° F. and a pressure between 500 and 2000 lbs. per square inch in the presence of an inert solvent.

8. A process for polymerizing an alpha alkyl styrene in which the alkyl group contains not more than three carbon atoms, which comprises contacting said alpha alkyl styrene with a hydrogenating catalyst and an alkali metal aralkyl compound where the alkali metal is directly bonded to the aralkyl radical, at a temperature between 50° F. and 300° F. and a pressure between 500 and 2000 lbs. per square inch in the presence of an inert solvent.

RANDALL G. HEILIGMANN.

REFERENCES CITED

The following references are of record in the file of this patent:

UNITED STATES PATENTS

| Number | Name | Date |
| --- | --- | --- |
| 2,160,933 | Wiley | June 6, 1939 |
| 2,160,939 | Reinhardt | June 6, 1939 |

OTHER REFERENCES

Ziegler and Kkeiner: "Polymerization ungesättiger Kohlenwasserstoffer unter dem Einfluss von Alkalimetallen und Alkalimetallalkylen," Ann., 473, pages 57–82, (1929) (especially page 73).

Ziegler and Jacob: "Die Katalyse" der Polymerization von ungessättige Kohlenwasserstoffen durch alkaliorganische Verbindungen," Ann., 511, pages 45–63, (1934) (especially page 45).

Morton et al.: J. Am. Chem. Soc., 69, pages 167–172 (1947).